July 10, 1951  W. H. LANIER  2,559,882
NOSE CONSTRUCTION FOR MODEL AIRPLANES
Filed Aug. 17, 1948

INVENTOR.
WILLIAM H. LANIER
BY C. G. Stratton
ATTORNEY

Patented July 10, 1951

2,559,882

UNITED STATES PATENT OFFICE 2,559,882

NOSE CONSTRUCTION FOR MODEL AIRPLANES

William H. Lanier, Glendale, Calif.

Application August 17, 1948, Serial No. 44,632

5 Claims. (Cl. 46—78)

This invention relates to a nose construction for model airplanes.

An object of the present invention is to provide a nose structure for model airplanes that embodies a flywheel on the motor shaft of said airplane to smooth out the operation of said motor and a propeller on said shaft.

Another object of the invention is to provide a novel nose structure that is simple to assemble, is self-locking, and automatically aligns itself with the fuselage of the airplane.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Figure 1:
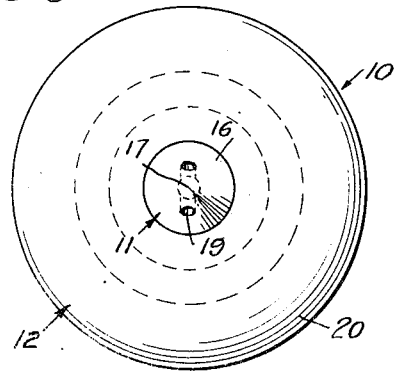
Fig. 1 is a front elevational view of a nose construction according to the invention.
Figure 2:
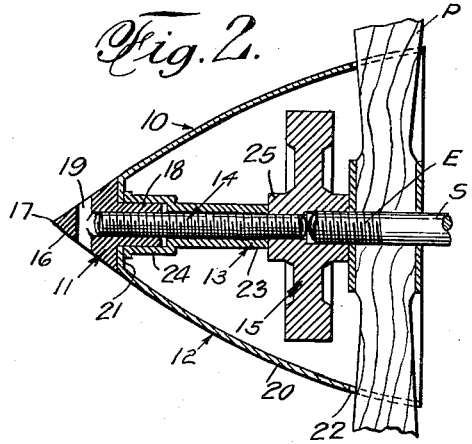
Fig. 2 is a typical longitudinal sectional view thereof.
Figure 3:
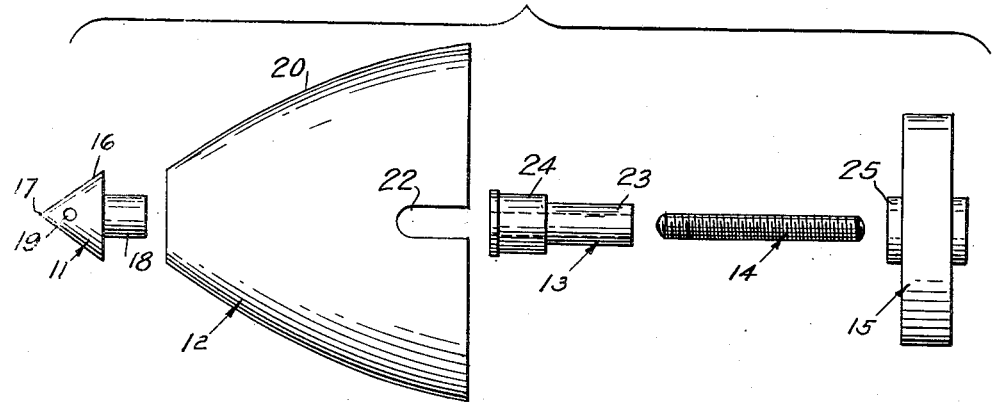
Fig. 3 is an exploded side elevational view of the elements comprising the nose structure.
Figure 4:
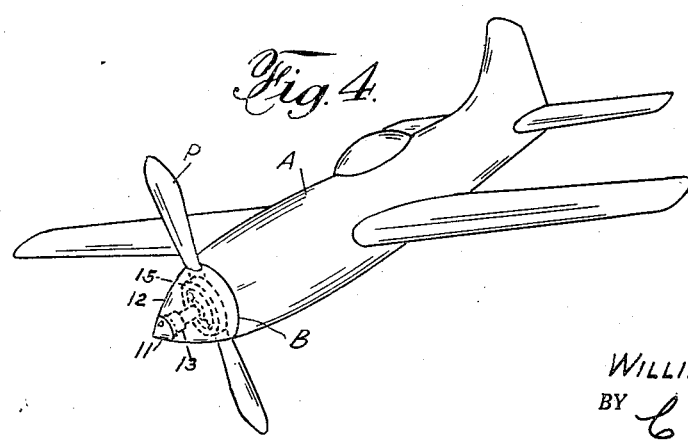
Fig. 4 is a perspective view, to a reduced scale, of a model airplane equipped with the structure of the present invention.

The drawing, in Fig. 4, shows a conventional model airplane of which the fuselage A terminates, at the front, in an edge B beyond which a propeller P, that comprises the traction means for said airplane, is located. Said propeller, conventionally, is mounted on the output shaft S of a motor (not shown). The motor is of the internal combustion type, embodies reciprocating parts, and, because of its small size, is frequently erratic in operation. Even when the motor is efficiently performing, the shaft S does not smoothly rotate for lack of inertia means, the weight or mass of the propeller being insufficient to smoothen the fluctuations in the motor shaft and overcome the variable torque of the motor.

Accordingly, the invention contemplates a nose structure 10 that comprises a forward extension of the fuselage A and embodies inertia means. Said structure 10 is fitted to and retained by the threaded end E of shaft S.

The structure 10 that is illustrated comprises, generally, a combined nose tip and nut 11, a streamlined cowl 12 between said nut and edge B of the fuselage, a sleeve 13 extending axially in said cowl, a threaded stud 14 extending freely through said sleeve and engaged at one end with nut 11, and a flywheel 15 threaded on the other end of stem 14 and also threadedly engaged with end E of shaft S.

The nut 11 is formed with a conical part 16 that forms a smooth continuation of stream-lined cowl 12 and terminates in a tip 17, and with an internally threaded shank 18 for the stud 14. Rotation of the nut on said stud is afforded through the medium of any elongated member extending through a transverse hole 19 in conical part 16.

The cowl 12 is formed as a shell 20 that flares rearwardly from a transverse apertured wall 21 and terminates short of edge B of the fuselage. Said shell is provided with notches or the like 22 through which the propeller blades extend.

The sleeve 13 has its rearward part 23 loosely fitting over stud 14 and is formed with an enlarged forward part 24 having a counter bore therein that has a sliding fit with nut shank 18, the latter extending through apertured wall 21 of the cowl. Thus, the nut and sleeve serve to lock the cowl between them.

The stud 14 is of such length that one end thereof extends rearwardly beyond sleeve 13.

The flywheel 15 is as large as practicable to fit with suitable clearance in the cowl, the same, axially, has a threaded bore, for the end of stud 14, that extends part way through the hub 25, and a similar connecting threaded bore of a size to fit shaft end E.

Assembly is simple. The flywheel is first connected to shaft end E and tightened against propeller P, thus constituting a nut for locking the propeller in place. The stud 14 is then threaded into the flywheel finger-tight. Then the sleeve 13 is slipped over the stud. Then with the shank 18 inserted into the apertured wall of the cowl, nut 11 is engaged with the stud. Finally, a nail or other elongated member is inserted into hole 19 and employed as a lever to simultaneously tighten stud 14 in the flywheel so that the end thereof tightly impinges the end of shaft S, firmly lock sleeve 13 between the flywheel and wall 21, said sleeve thus comprising a spacer, and tighten the threaded engagement between the nut and the stud.

It is evident that sleeve 13 serves to prevent binding of the cowl against shaft end E of the fuselage. Thus, the entire assembly is rotatable with shaft S and propeller P, the flywheel, by its inertia, causing non-fluctuating smooth operation of shaft S as hereinbefore stated. It will further be seen that the assembly is self-aligning.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a model airplane having a fuselage terminating in a front edge and having a motor shaft and a propeller on said shaft forward of said edge, the combination of a flywheel on the end of said shaft forward of the propeller, a threaded stud engaged with the flywheel and axially aligned with the motor shaft, a streamlined cowl positioned to form a forward extension of the fuselage, and means engaged with said stud for mounting said cowl to rotate with the stud, the flywheel and the propeller.

2. In a model airplane having a fuselage terminating in a front edge and having a motor shaft and a propeller on said shaft forward of said edge, the combination of a flywheel on the end of said shaft forward of the propeller, a threaded stud engaged with the flywheel and axially aligned with the motor shaft, a sleeve over said stud and in end abutment with the flywheel, a streamlined cowl having a forward apertured end wall in end abutment with the sleeve, and a nut engaged with the stud and extending through said apertured wall for locking said cowl against the end of said sleeve.

3. In a model airplane having a fuselage terminating in a front edge and having a motor shaft and a propeller on said shaft forward of said edge, the combination of a flywheel on the end of said shaft forward of the propeller, a threaded stud engaged with the flywheel and axially aligned with the motor shaft, said stud being in firm end abutment with the end of the motor shaft whereby the same comprises a forward extension of said motor shaft, a streamlined cowl positioned to form a forward extension of the fuselage, and means engaged with said stud for mounting said cowl to rotate with the stud, the flywheel and the propeller.

4. A cowl structure for model airplanes having a motor shaft and a propeller thereon, said structure comprising a flywheel mounted on said shaft and forward of the propeller, a streamlined cowl enclosing the flywheel, and means extending forward of the flywheel for connecting the cowl and the flywheel for rotation together, said means comprising a stud having threaded engagement with the flywheel and aligned with the motor shaft, a sleeve over said stud in end abutment at one end with the flywheel and at the other end with the forward end of the cowl, and a nut on the stud for clamping the cowl to the sleeve and thereby locking the sleeve to the flywheel.

5. A cowl structure for a model airplane having a fuselage terminating in a front edge and having a motor shaft extending forward of said front edge and a propeller on said extension, said structure comprising a streamlined cowl having abutment with said fuselage edge and forming a forward extension of said fuselage, said cowl having an opening in its forward end aligned with said shaft extension, a nut extending into said opening from the front end of the cowl, a stem threadedly connected with said nut and extending to engage the end of said shaft extension, a sleeve over said stem and having one end in abutment with the forward end of the cowl and a coupling element connecting said motor shaft extension and said stem, the other end of said sleeve being in end abutment with said coupling element.

WILLIAM H. LANIER.

REFERENCES CITED

The following references are of record in the file of this patent:

UNITED STATES PATENTS

| Number | Name | Date |
|---|---|---|
| 1,423,819 | Shapiro | July 25, 1922 |
| 1,565,437 | Greife | Dec. 15, 1925 |
| 1,723,446 | Schutte | Aug. 6, 1929 |
| 2,158,344 | Walker | May 16, 1939 |